United States Patent Office 3,651,227
Patented Mar. 21, 1972

3,651,227
VETERINARY COMPOSITIONS AND METHODS
John S. Sickles, Portola Valley, Calif., assignor to
Syntex Corporation, Apartado, Panama
No Drawing. Filed Aug. 11, 1969, Ser. No. 849,167
Int. Cl. A61k 27/00
U.S. Cl. 424—238                     7 Claims

ABSTRACT OF THE DISCLOSURE

Compositions containing and methods employing a corticosteroid for stimulating growth and lactation in domestic animals. $6\alpha,9\alpha$-difluoro-$16\alpha$-methylpregna-1,4-diene-$11\beta,17\alpha,21$-triol-3,20-dione is illustrated as representative of the useful corticosteroid class.

BACKGROUND OF THE INVENTION

Field of the invention

The present invention relates to improvements in the field of agricultural science. More particularly, the present invention is directed to means for increasing growth or weight gain and lactation or milk production in domestic animals, particularly, ruminants and swine.

The science of efficiently raising domestic animals for meat and milk production is one which has attained considerable value and attention in the agricultural field. Efforts are constantly being expended to provide new methods for increasing the rate on investments made in the raising of domestic animals.

Of special value and utility in this field is a method which increases the production of high quality meat and milk at an accelerated rate.

Description of the prior art

Efforts to increase growth rates have not always proved commercially or economically successful.

Hormonal agents, natural and synthetic, have been employed in an attempt to obtain increases in the growth and milk production rate of various animals. These attempts have shown that large amounts of, for example, esterogens, are required to achieve desirable results. These large amounts, however, often cause other undesirable results, such as excessive sexual stimulation, degenerative effects on the reproductive systems, and inferior quality meat. Because of these impracticalities, commercial success has not always been realized. Further, it has been shown that milk production in lactating rats can be increased only when the animal is injected with corticosterone or aldosterone in amounts substantially at or above those considered therapeutic, that is, those amounts which elicit a general corticoid effect. See Hahn et al., "Effect of Corticosterone and Aldosterone Upon Milk Yield in the Rats," Proceedings of the Society for Experimental Biology and Medicine, 121, 1056–8 (1966) and U.S. Pat. 2,751,303 issued June 19, 1956.

Because of these results, general reports on the subject have tended to cast doubt on the commercial feasibility of increasing growth and milk production—see Hormonal Relationship and Applications, National Academy of Sciences, National Research Council Publication No. 714 (Library of Congress Catalog Card. No. 54–1683).

SUMMARY OF THE INVENTION

Now it has been discovered that growth and lactation in domestic animals can be significantly increased by the administration to the animal of a corticosteroid in amounts far less than those normally associated with therapeutic benefits. Therapeutic oral or parenteral dosages of corticosteroids, such as for the treatment of inflammatory or metabolic conditions, are in the range of from about one up to about 1500 mg. per animal per day. Thus, in the case of cattle (bovine), daily orally-administered therapeutic amounts of dexamethasone range from about 7 $\mu$g. to about 30 $\mu$g. per kilogram of body weight or from about 5 to 20 mg. or 5,000 to 20,000 $\mu$g. per animal.

The present invention provides accelerated rates of growth and lactation by the administration of corticosteroids in non-therapeutic amounts, that is amounts approximating 0.1% of those considered therapeutic. By the term "non-therapeutic amounts" is meant amounts substantially less, by orders of magnitude, than those considered therapeutic, as discussed more completely hereinafter.

The process of the present invention comprises administering a corticosteroid to domestic animals selected from ruminants and swine, the amount of said corticosteroid administered corresponding in effect to that of an amount of $6\alpha,9\alpha$ - difluoro-$16\alpha$-methylpregna-1,4-diene-$11\beta,17\alpha,21$-triol-3,20-dione ranging from about 0.0015 $\mu$g. to about 0.07$\mu$g. per kilogram of animal body weight per day.

The process of the present invention is practiced by use of a composition comprising a corticosteroid in admixture with a non-toxic carrier suitable for oral or parenteral administration to domestic animals selected from ruminants and swine, said corticosteroid being present so as to provide an amount corresponding in effect to that of an amount of $6\alpha,9\alpha$ - difluoro-$16\alpha$-methylpregna-1,4-diene $11\beta,17\alpha,21$-triol-3,20-dione ranging from about 0.0015 $\mu$g. to about 0.07 $\mu$g. per kilogram of animal body weight per day.

Preferably, the useful dosage corresponds in effect to that of an amount of $6\alpha,9\alpha$-difluoro-$16\alpha$-methylpregna-1,4-diene-$11\beta,17\alpha,21$-triol-3,20-dione ranging from about 0.003 $\mu$g. to about 0.03 $\mu$g. per kilogram of animal body weight per day; more preferably from about 0.007 $\mu$g. to about 0.03 $\mu$g. per kilogram of animal body weight per day.

This effective dosage, when expressed in terms of amount per animal per day, therefore, corresponds in effect to that of an amount of $6\alpha,9\alpha$-difluoro-$16\alpha$-methyl-pregna-1,4-diene-$11\beta,17\alpha,21$-triol-3,20-dione ranging from about one $\mu$g. to about 50 $\mu$g. per animal per day, preferably from about 2.5 $\mu$g. to five $\mu$g. to about 20 $\mu$g. per animal per day.

The corticosteroid $6\alpha,9\alpha$-difluoro-$16\alpha$-methylpregna-1,4-diene-$11\beta,17\alpha,21$-triol-3,20-dione is the scientific name for the steroid compound which has been commonly referred to as flumethasone.

Useful corticosteroids for the purposes of the present invention include those which elicit a response typical of corticoid agents when administered in sufficient (therapeutic) amounts. Many of these compounds are described, for example, in Steroid Drugs by Norman Applezweig, volume I, McGraw-Hill Book Company, Inc., 1962, and volume II, Holden Day, Inc., 1964. Typical of the corticosteroids which are useful in accordance with the process of the present invention are, by their common names, flumethasone, dexamethasone, betamethasone, triamcinolone, triamcinolone acetate, prednisone, prednisolone, 9$\alpha$-fluoro-prednisolone, cortisone, hydrocortisone, paramethasone, and methylprednisolone. However, this invention is useful employing various other corticoid agents.

These corticosteroids vary in activity or therapeutic potency. However, the ranges given with respect to $6\alpha,9\alpha$-difluoro - $16\alpha$ - methylpregna-1,4-diene-$11\beta,17\alpha,21$-triol-3,20-dione are applicable to the other corticosteroids by administering an amount thereof which is equivalent to the amount of $6\alpha,9\alpha$ - difluoro - $16\alpha$-methylpregna-1,4-diene-$11\beta,17\alpha,21$-triol-3,20-dione set forth. Thus, the present invention is practiced by administering an amount of 6α,9α - difluoro - 16α - methylpregna - 1,4 - diene-11β,17α,21-triol-3,20-dione within the given dosage range hereof, or an equivalent amount of other corticosteroid. Relative potencies are known or are determinable by routine experimentation in accordance with the skills of the art.

Domestic animals which respond to the process of the present invention include those normally considered domestic farm animals, including the ruminants, such as bovine or cattle and goats and sheep, as well as swine or pigs. The process of the present invention is useful for growth acceleration in both the male and female of the species. For increasing milk production, the process of the present invention is used with a lactating female. In each instance, the process of the present invention involves supplying the corticosteroid over an extended but finite period and at a fixed or variable dosage rate within the ranges given above.

The present invention also includes the administration of a mixture of two or more corticosteroids at the appropriate, effective rate. In addition, the active corticosteroid may be administered in combination with various other medicinal agents so as to achieve therapeutic effects supplemental to growth and lactation acceleration.

In the practice of the present invention, while the amount of administered corticosteroid is essential and critical, the mode of administration is not a matter of material importance. Thus, the corticosteroid can be administered via any of the normally employed routes, whether orally or parenterally, in admixture with a non-toxic, acceptable carrier.

Via the oral mode, the corticosteroid is conveniently added as a supplement in admixture with the normal feed ration or diet of the animal. Thus, the corticosteroid can be incorporated into a feed ration which is part of the daily, normal die of the animal. The corticosteroid can also be orally administered directly, such as by use of an oil or other carrier or, in the ruminants, by use of a bolus which permanently lodges in either the rumen or the reticulum of the forestomachs, releasing the active ingredient continuously over an extended period of time.

The process of the present invention can also be practiced by administering the corticosteroid parenterally, such as by the use of subcutaneous implants which slowly release the active ingredient or by direct, intramuscular or subcutaneous injection.

Suitable solid or liquid, non-toxic adjuncts, which may be useful as carriers for the active ingredient in the various administrative routes available, include the natural oils, such as peanut oil, coconut oil, and the like, as well as their hydrogenated derivatives; fatty acids, such as lauric acid, myristic acid, palmitic acid, oleic acid, stearic acid, arachidic acid, behenic acid, lignoceric acid, and the like; fatty alcohols, such as lauryl alcohol, hydristyl alcohol, cetyl alcohol, stearyl alcohol, and the like; fatty amides, such as those of the above fatty acids, e.g., auramide, stearamide, etc., fatty acid esters, including those of fatty alcohols, e.g., cetyl palmitate; mono and diesters of glycerine, e.g., glyceryl monostearate, glyceryl dioleate, etc.; propylene glycol or the mono and fatty diesters of propylene glycol as well as mono and diesters of polyethylene glycol; natural organic waxes, such as beeswax, carnauba wax, bayberry wax, candelila wax, and the like; paraffin and hydrocarbon waxes; petrolatum; powdered polyolefins, such as polyethylene, polypropylene, etc.; acrylics, such as polymethacrylate, including acrylic copolymers, shellacs, resins, and the like. At the doses used, certain of the compounds can be administered via an aqueous solution.

In any event, the route of administration should provide for a substantially complete absorption of the active material into the physiological system of the animal treated in accordance with the given dosage. Thus, while the use of skin implants or a permanent bolus is included within the scope of the present invention so as to provide for a slow release of active ingredients over an extended but finite period of time, in the preferred embodiment hereof, the administration of an active ingredient is done over a similar extended but finite period of time comprising single daily administration of small dosages. These preferred embodiments are best practiced through the use of oral administration; practically, by incorporation or by addition, such as a top dressing, of the active ingredient in the feed mixture of the animal treated. In this instance, the normal feed ration serves as the carrier.

DESCRIPTION OF THE PREFERRED EMBODIMENTS

The following examples typify the manner by which the present invention can be practiced and represent, in one aspect, the best mode for carrying out the invention. As such, they should be construed merely as illustrative and not as limitative upon the overall scope hereof.

EXAMPLE 1

Twenty-four Holstein cows which have initiated their second or third lactations are divided into four groups of six cows per groups. One of the three treatment groups receives one of 5 μg., 10 μg., and 20 μg. of 6α,9α-difluoro-16α - methylpregna-1,4-diene-11β,17α,21-triol-3,20-dione dispersed in a 40% aqueous solution of propylene glycol, daily. The fourth group is maintained as a control and receives only the 40% aqueous propylene glycol solution. In all other respects, each of the twenty-four cows are maintained in a similar environment and feed ration regimen. The treatment is initiated four days port-partum and is continued for 305 days or during the lactation period of each animal. Milk yields are recorded at each of two milkings daily and the yield recorded. Observations of health and subsequent reproductive performance are noted. The results during the first 168 days of the treatment are given in Table 1.

TABLE 1

| Characteristic | Control | 5 μg./ daily | 10 μg./ daily | 20 μg./ daily |
| --- | --- | --- | --- | --- |
| Average daily milk production (lbs.) | 61.3 | 70.9 | 71.6 | 64.0 |
| Total average milk production (lbs.) | 10,298 | 11,911 | 12,029 | 10,752 |

The results during the first 202 days of the test are given in Table 2.

TABLE 2

| Characteristic | Control | 5 μg./ daily | 10 μg./ daily | 20 μg./ daily |
| --- | --- | --- | --- | --- |
| Average daily milk production (lbs.) | 58.2 | 66.9 | 68.5 | 59.5 |
| Total average milk production (lbs.) | 11,756 | 13,514 | 13,837 | 12,019 |

The average daily yield in pounds over the entire lactation period of these cows ranging in length from 202 to 305 days, expressed as the total pounds per day in milk, are as follows:

Control _____ 50.9
5 μg. _____ 50.9
10 μg. _____ 58.3
20 μg. _____ 52.5

Substantially identical, subsequent reproductive functions are observed with the cows in each group. Similarly, no significant difference in the health of any of the animals in the four groups is observed.

EXAMPLE 2

Twenty-four cows are maintained on pasture and are milked twice daily at which time they each receive a feed concentrate in the ratio of one pound of concentrate for each three pounds of milk produced. This ratio is continued throughout the lactation period of each cow. The concentrate mixture contains 14% crude protein and 74% total digestable nutrients. Alfalfa hay is fed ad libitum twice daily. All of the cows have access at all times to trace mineralized salt, a mineral mixture of calcium and phosphorous, and water.

The concentrate is made available in the form of pellets, the content being as set forth below, expressed in parts by weight.

| | |
|---|---:|
| Barley | 1414 |
| Oats | 108 |
| Soybean oil meal | 303 |
| Molasses | 108 |
| Dicalcium phosphate | 65 |
| Salt (traced mineralized) | 20 |
| Vitamin E (10,000 IU) | — |
| Vitamin A (6,000,000 IU) | — |
| | 2020 |

The cows are separated into four groups. One group is maintained as the control. Each of the other three groups receives treatment of 6α,9α-difluoro-16α-methyl-pregna-1,4-diene-11β,17α,21-triol-3,20-dione as an ingredient added as a top dressing to the concentrate so as to provide one of 5μg., 10 μg., and 20 μg. daily, respectively to one of the three groups. Body weights of all the cows are measured at the start of treatment and every 30 days thereafter. Complete observations on all twenty-four cows are available to the 210th day of treatment. The average body weight gain per treatment group over the period is as follows (Table 3):

TABLE 3

| Characteristic: | Avg. wt. gain (lbs.) |
|---|---:|
| Control | 58 |
| 5 μg. daily | 86 |
| 10 μg. daily | 156 |
| 20 μg. daily | 125 |

After the usual period post-partum, each of the cows are bred, with the following results (Table 4) expressed as average days open or not pregnant per group.

TABLE 4

| Characteristic: | Avg. days open |
|---|---:|
| Control | [1]145 |
| 5 μg. daily | 106 |
| 10 μg. daily | 114 |
| 20 μg. daily | 108 |

[1] One cow failed to conceive.

EXAMPLE 3

The procedures of Examples 1 and 2 are repeated, with similar results in each instance, using the following corticosteroids at the indicated dosage range.

| Compound: | Dose [1] |
|---|---|
| 9α-fluoro-16α-methylpregna-1,4 - diene - 11β,17α,21-triol - 3,20 - dione (dexamethasone) | 0.006–0.28 (4–100) |
| 9α - fluoro - 16β - methylpregna - 1,4 - diene-11β,17α,21 - triol - 3,20-dione (betamethasone) | 0.012–0.12 (10–20) |
| 9α - fluoro - 16α,17α - isopropylidenedioxypregna-1,4 - diene-11β,21-diol-3,20-dione (triamcinolone acetonide) | 0.056–0.24 (40–160) |
| Pregna - 1,4 - diene-11β,17α,21 - triol - 3,20 - dione (prednisolone) | 0.12–2.4 (80–400) |
| Pregna - 1,4-diene-17α,21-diol - 3,11,20 - trione prednisone) | 0.24–5.6 (200–4000) |
| 9α - fluoropregna-1,4-diene-11β,17α,21 - triol - 3,20-dione (9α - fluoroprednisolone) | 0.14–1.4 (100–1000) |
| Pregn - 4 - ene-11β,17α,21-triol - 3,20 - dione (hydrocortisone) | 1.5–30 (1000–20,000) |
| Pregn - 4 - ene-17α,21-diol-3,11,20 - trione (cortisone) | 1.5–70 (1000–50,000) |

[1] μg./kg. animal body wt./day (μg./animal/day).

EXAMPLE 4

The procedures of Examples 1, 2, and 3 are repeated using goats as the recipient domestic animal, with similar growth and lactation increases in each instance.

EXAMPLE 5

The procedures of Examples 1, 2, and 3 are repeated using swine as the recipient domestic animal, administering the corticosteroid in an amount corresponding in effect to that of an amount of 6α,9α-difluoro-16α-methyl-pregna-1,4-diene-11β,17α,21-triol-3,20-dione of 0.01 μg., 0.025 μg., and 0.05 μg. per kilogram of animal body weight per day. The corticosteroid is administered over a period of four to six weeks beginning at parturition. The offspring of those sows receiving the corticosteroid have increased rates of growth with a shorter weaning period when compared with the offspring of the sows of the control groups not receiving the corticosteroid.

EXAMPLE 6

The procedures of Examples 1, 2, and 3 are repeated using sheep as the recipient domestic animal, with similar growth and lactation increases.

EXAMPLE 7

The procedures of Examples 1 to 6 are repeated, administering the corticosteroids at similar dosage levels by intramuscular or subcutaneous injection, with similar growth and lactation increases in each instance.

EXAMPLE 8

Glyceryl monostearate (200 g.) and 50 g. polyethylene glycol (Carbowax 4000) are combined and melted. 6α,9α-difluoro - 16α - methylpregna-1,4-diene-11β,17α,21-triol-3,20-dione (72 mg.) is then added and mixed and the resulting melt is granulated with 350 g. of barium sulfate. The mass is screened and divided into 24 portions. Each portion is compressed providing 24 cylinders, each having a density of about 1.9 g./cm.³ and containing 3 mg. of the named corticosteroid. Each cylinder, upon oral administration to an adult normal cow, lodges in the rumen or recticulum and releases about 0.01 mg. or 10 μg. of the named corticosteroid per day for 300 days. When so administered, starting four days port-partum, increases in weight and lactation similar to those observed in Examples 1 and 2 are obtained.

EXAMPLE 9

The procedure of Example 8 is repeated with the corticosteroids listed in Example 3 (at the appropriate dose) in accordance with the procedures of Examples 1, 2, 4, 5, and 6, with similar growth and lactation increases in each instance.

What is claimed is:

1. The process useful for increasing lactation in a normal lactating ruminant domestic animal which comprises administering to said domestic animal an amount of 6α,9α-difluoro - 16α - methylpregna-1,4-diene-11β,17α, 21-triol-3,20-dione ranging from about 0.0015 μg. to about 0.07 μg. per kilogram of animal body weight per day.

2. The process according to claim 1 wherein the 6α,9α-difluoro - 16α - methyl-pregna-1,4-diene-11β,17α,21-triol-3,20-dione is administered to a normal lactating cow.

3. The process according to claim 1 wherein the amount of said 6α,9α-difluoro-16α-methylpregna-1,4-diene-11β,17α,21-triol-3,20-dione administered is in the range of from about 0.003 μg. to about 0.03 μg. per kilogram of animal body weight per day.

4. The process according to claim 1 wherein the 6α,9α-difluoro - 16α - methylpregna-1,4-diene-11β,17α,21-triol-3,20-dione is orally administered to the domestic animal.

5. The process according to claim 4 wherein the 6α,9α-difluoro - 16α - methylpregna-1,4-diene-11β,17α,21-triol-3,20-dione is orally administered to the domestic animal in admixture with the normal feed ration or diet.

6. The process useful for increasing lactation in a normal lactating swine domestic animal which comprises administering to said domestic animal an amount of 6α,9α-difluoro - 16α - methylpregna-1,4-diene-11β,17α,21-triol-3,20-dione ranging from about 0.0015 μg. to about 0.07 μg. per kilogram of animal body weight per day.

7. The process according to claim 6 wherein the amount of said 6α,9α-difluoro-16α-methylpregna-1,4-diene-11β,17α,21-triol-3,20-dione administered is in the range of from about 0.003 μg. to about 0.03 μg. per kilogram of animal body weight per day.

References Cited

UNITED STATES PATENTS 3,036,917   5/1962   Harrop _____ 99—2

OTHER REFERENCES

Chemical Abstracts, vol. 60, entry 3246a, 1964. Copy in POSL.

Fieser et al., Steroids, published by Reinhold Publishing Corp., N.Y., 1959, pages 610–612. Copy in Group 124.

RICHARD L. HUFF, Primary Examiner